(12) United States Patent
Savic et al.

(10) Patent No.: US 7,448,217 B2
(45) Date of Patent: Nov. 11, 2008

(54) POWER PLANT

(75) Inventors: Sasha Savic, Wettingen (CH); Daniel Klaesson, Hallen (SE); Flavio Ferrari, Nussbaumen (CH); Carlos Jimenez Haertel, Munich (DE)

(73) Assignee: ALSTOM Technology Ltd, Baden (CH)

( * ) Notice: Subject to any disclaimer, the term of this patent is extended or adjusted under 35 U.S.C. 154(b) by 130 days.

(21) Appl. No.: 11/411,913

(22) Filed: Apr. 27, 2006

(65) Prior Publication Data

US 2006/0254283 A1 Nov. 16, 2006

Related U.S. Application Data

(63) Continuation of application No. PCT/EP2004/052708, filed on Oct. 28, 2004.

(30) Foreign Application Priority Data

Oct. 30, 2003 (CH) .................................. 01857/03

(51) Int. Cl.
*F02C 3/30* (2006.01)
*F02C 6/18* (2006.01)

(52) U.S. Cl. ...................... 60/775; 60/39.182; 60/39.53

(58) Field of Classification Search .............. 60/39.182, 60/39.53, 39.54, 39.55, 39.59, 728, 775
See application file for complete search history.

(56) References Cited

U.S. PATENT DOCUMENTS

| | | | |
|---|---|---|---|
| 4,731,909 A | | 3/1988 | Duda |
| 5,303,544 A | * | 4/1994 | Kobayashi et al. ........ 60/39.182 |
| 5,404,708 A | * | 4/1995 | Sigling et al. ................. 60/775 |
| 6,378,284 B1 | * | 4/2002 | Utamura ....................... 60/775 |
| 6,644,013 B1 | * | 11/2003 | Hatamiya et al. ........... 60/39.53 |
| 2004/0025513 A1 | * | 2/2004 | Walsh et al. ................... 60/775 |

FOREIGN PATENT DOCUMENTS

| | | |
|---|---|---|
| DE | 25 49 790 A1 | 5/1977 |
| EP | 0 781 909 B1 | 10/2003 |
| FR | 1563749 | 3/1969 |
| WO | WO 99/67519 | 12/1999 |

* cited by examiner

*Primary Examiner*—Louis J Casaregola
(74) *Attorney, Agent, or Firm*—Buchanan Ingersoll & Rooney PC

(57) ABSTRACT

A combined cycle power plant comprises a gas turbo group and a water/steam circuit A liquid atomization device is arranged, upstream of the compressor, in the intake duct of the gas turbo group. The liquid under pressure, which is intended to be injected into the compressor inflow, is branched off from the water/steam circuit.

12 Claims, 7 Drawing Sheets

POWER PLANT

TECHNICAL FIELD

The present invention relates to a power plant according to the preamble of claim 1 and to a preferred operating method.

PRIOR ART

It is well known in the prior art, for example from DE 25 49 790, to inject a liquid into the intake tract of internal combustion engines, such as, for example, gas turbo groups. As a result of the evaporation of liquid, the intake air is cooled, and the power is increased. The effect can be further enhanced if the injected liquid mass flow is selected such that the intake air can no longer absorb this, that is to say is oversaturated with liquid, in such a way that at least part of the liquid evaporates only during compression. If, therefore, liquid drops penetrate into the largely adiabatic turbo compressor of a gas turbo group, the evaporation in the compressor also produces intensive internal cooling, and the power consumption of the compressor is reduced, which can significantly increase the net power output of the gas turbo group. This method has become known, inter alia, as overfogging or wet compression. In addition, the straightforward evaporation cooling of the intake air by injected liquid drops is designated as fogging.

FR 1,563,749 already describes atomization quality as a critical variable for carrying out a method of this type. For this purpose, on the one hand, the prior art proposes air-assisted atomizer nozzles in EP 781909. The disadvantage of these is the consumption of compressed air which, in turn, reduces the exploitable power potentials. Furthermore, for example, U.S. Pat. No. 4,731,909 describes ultrasonic atomizers. In practical application, pressure atomizer nozzles are used on account of their simplicity, or else what is known as the swirl flash technology which became known from WO 9967519. For pressure atomization, high liquid pressures are required, which usually markedly overshoot an order of magnitude of 50 bar and may perfectly well reach 100 to more than 150 bar. In this case, mass flows of a few % of the air mass flow are conveyed; a typical order of magnitude in currently conventional gas turbo groups with powers of 150 MW and above is around 50 kg/s of water, and this number may arbitrarily deviate upward. The size of the required water pumps, which requires considerable cost outlay, becomes clear from this. Furthermore, high water mass flows have to be suitably treated.

In summary, the provision of the liquid mass flow of the liquid injection described above necessitates a considerable outlay in terms of components and causes considerable costs.

PRESENTATION OF THE INVENTION

The invention is intended to remedy this. The object on which the invention characterized in the claims is based is to specify a power plant of the type initially mentioned which can avoid the disadvantages of the prior art.

This object is achieved, according to the invention, using the whole of the features of claim 1.

The essence of the invention, therefore, is to use components present in any case for the provision of the necessary pressure water mass flow. The invention in this case proceeds from a combined cycle power plant, in which, in a way known per se, the exhaust gas flow path of a gas turbo group has arranged in it a waste heat recovery steam generator, in which pressurized steam is generated for driving a steam turbine. In this case, the invention makes use of the fact that the water/steam circuit formed, inter alia, by the waste heat recovery steam generator and the steam turbine has a water treatment system and at least one boiler feed pump or other conveying pumps. A high-pressure boiler feed pump makes available, for the generation of high-pressure fresh steam for driving the steam turbine, feed water which has pressures of typically around 90 to 150 bar or even above. The combined cycle power plant consequently has suitable means for providing a suitable liquid and a conveying pump for the treatment and provision of a sufficiently high liquid mass flow at a sufficiently high pressure. The invention makes use of this in that a supply line branches off from the water/steam circuit, downstream of a conveying or feed pump, at a point of suitable pressure, and leads to the initially mentioned atomization device in the intake tract of the gas turbo group. Preferably, at least one shutoff and throttle member is arranged in the supply line. These may be a separate shut off member and a pressure regulating valve.

A branch of this type can be installed comparatively simply, since the pipelines of the water/steam circuit conventionally have a multiplicity of access points which serve, for example, for sampling and which are shut off in normal operation by means of dummy flanges or else by means of shut off members. Here, of course, the said supply line for the atomization device can be arranged very easily and at a low additional outlay in terms of apparatus.

Furthermore, multiple-pressure waste heat recovery steam generators are known, which have a plurality of (normally two or three) pressure stages, each with a boiler feed pump. In this case, a pressure stage of suitable pressure is to be selected for the arrangement of the branch point.

In one embodiment, a line branches off from the water/steam circuit upstream of the waste heat recovery steam generator.

In a further embodiment, a line branches off from the water/steam circuit within the flow path of the waste heat recovery steam generator. In this case, in one embodiment, the branch point is selected such that liquid water is extracted, the state of which advantageously lies sufficiently well below boiling point. This ensures maximum safety against cavitation damage. In the case of a drum boiler which has a preheater, a drum with an evaporator and a superheater, the branch line is then arranged upstream of the drum in the preheater or, at the latest, at the drum. In the latter case, however, it must be taken into account that the branched-off water is saturated water so that a slight pressure decrease leads to spontaneous boiling.

In the case of a once-through flow heater of the drumless type of construction known per se, the feedwater is heated, evaporated and superheated in one flow path and essentially in one pipe run. The branch point is then to be selected such that it is arranged upstream of the point at which boiling occurs for the first time.

In a further embodiment, two branch lines are arranged at two different points of the water/steam circuit, preferably in such a way that water of different temperatures is extracted. For example, a first branch line is arranged upstream of the waste heat recovery steam generator, and a second branch line is arranged in the flow path of the waste heat recovery steam generator. Both branch lines issue indirectly, for example via a collector or a mixing preheater, or directly into a common supply line leading to the atomization device. Preferably, at least one of the two branch lines has a shut off or throttle member. This allows a variable setting of the temperature of the water which is to be injected into the intake air and which is supplied to the injection device, or regulation to a desired temperature value.

In a further advantageous embodiment, an embodiment with a regulatable media temperature is implemented, in that a first branch point is arranged at a point at which liquid water is extracted, in particular upstream of the first waste heat recovery steam generator. The second branch point is arranged downstream, specifically at a point of the water/steam circuit at which steam is present; in the case of appropriate pressure conditions, this may also involve an intermediate tapping of the steam turbine. Steam extraction is, of course, advantageously maintained so as to be regulatable and/or capable of being shut off. The extracted steam is then used as heating medium for the water extracted upstream, and serves for preheating the latter, for example, in a mixing preheater, the outflow of which issues in the supply line of the atomization device.

The regulation of the temperature of the injection water to a constant desired temperature value may be used, on the one hand, in order to avoid or limit different thermal expansions of the injection device.

The preferred embodiments described above are likewise prominently suitable for use in conjunction with what are known as swirl flash injection devices, such as are known from WO 9967519. In this case, advantageously, the temperature of the water to be injected into the intake air is adopted as a regulation variable for regulating the fractions of preheated and nonpreheated water, and this temperature is regulated to a desired value which lies, for example, around 200° C., the water, of course, being under pressure.

However, the regulatable preheating of the water to be injected may also be used most particularly advantageously for the prevention of icing of the compressor inlet. Icing in the compressor inlet may occur, on the one hand, in the case of specific ambient temperature and moisture ranges, but also when the power increase by means of overfogging, as it is known, that is to say the evaporation of drops during compression, is desired in ambient states which per se do not yet involve any risk of icing, but in which the mere evaporation cooling of the intake air brings about cooling up to potential icing. In this case, in one embodiment, the temperature in the inflow duct of the gas turbo group, as near as possible to the compressor inlet, is measured and is adjusted to a minimum value or desired value, in that, in the case of a water injection mass flow predetermined in another way, for example by means of a power controller of the gas turbo group, the mass flow ratio of the first, cooler or non preheated water part flow to the second part flow of warmer water or steam is varied as a function of this measured temperature. Preferably, both part flows can be regulated, in that the respective lines can be throttled. If the temperature of the compressor inlet lies above the desired value, the second, warmer part flow is throttled and consequently the fraction of cooler water is increased. The temperature of the water injected into the intake air and consequently of the intake air of the compressor inlet falls accordingly. At very high ambient temperatures and high ambient moisture, that is to say when the evaporation cooling effect cannot bring about a very low compressor inlet temperature, the first, cooler mass flow corresponds to the entire mass flow of the atomization device. Conversely, when a desired temperature at the compressor inlet is undershot, the relative fraction of the second, warmer mass flow can be increased, in order thereby, where appropriate, to prevent icing. The overall mass flow is determined, for example, by means of the power regulation of the gas turbo group, independently of the regulating operation described above.

In a further embodiment, a cooler for the water to be injected is arranged in the supply line. The cooler may be arranged alternatively to a regulatable preheating or else additionally. The cooler may be operated, as stated above, in order to adjust the water to be injected to a constant temperature. Thermal expansions of the injection device can consequently be avoided. In another preferred type of operation with a cooler, a temperature measurement point is arranged in the inflow duct of the compressor. The cooling capacity of the water can then be regulated such that the temperature of the compressor inlet of the gas turbo group is as low as possible, this being conducive to maximum power and the maximum efficiency of the gas turbo group, and, on the other hand, a minimum temperature permissible owing to potential icing in the compressor inlet is not undershot. Then, of course, the temperature of the injection water must also be detected downstream of the cooler, and the cooling capacity must be limited such that this temperature maintains a certain safety margin with respect to the freezing point of the liquid.

The intermixing of preheated and nonpreheated media which is proposed in connection with the invention has considerable advantages, as compared with an intermixing, proposed in U.S. Pat. No. 6,216,443, within an atomizer assisted by auxiliary media. On the one hand, the solution proposed in U.S. Pat. No. 6,216,443 can be used precisely only in conjunction with atomizers assisted by auxiliary media; application in the structurally particularly simple pressure atomizer or flash injection devices is automatically ruled out.

Furthermore, the embodiment proposed in connection with the invention allows a setting, regulation and limitation of the temperature of the atomization liquid and also the temperature in the inflow duct of the gas turbo group.

BRIEF DESCRIPTION OF THE DRAWING

The invention is explained in more detail below by means of exemplary embodiments illustrated in the drawing in which, in particular.

Elements not directly necessary for understanding the invention are omitted. The exemplary embodiments are to be understood purely instructively and are not to be employed in order to restrict the invention characterized in the claims.

WAY OF IMPLEMENTING THE INVENTION

Figure 1:
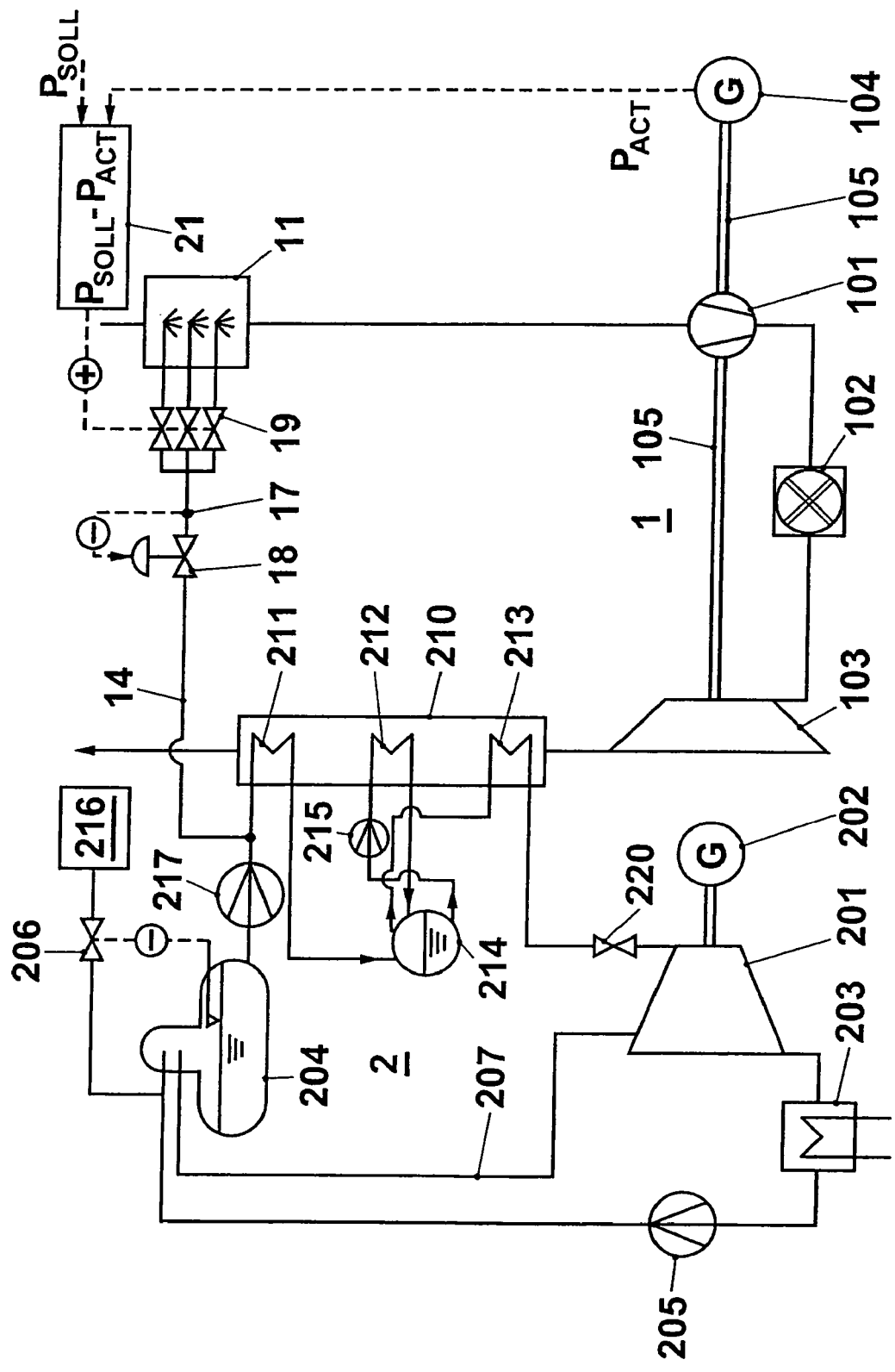
FIG. 1 shows a first embodiment of the invention.

The power plant illustrated in FIG. 1 comprises a gas turbo group 1 and a water/steam circuit 2. The gas turbo group 1, known per se, comprises a compressor 101, a combustion chamber 102, a turbine 103 and a generator 104. The turbine drives the compressor and the generator via a shaft 105. Furthermore, the gas turbo group illustrated has an injection and atomization device 11, arranged upstream of the compressor inlet in an inflow duct, for a liquid, in particular water. Liquid injected there can increase the power and efficiency of the gas turbo group in two ways: on the one hand, part of the liquid injected as a droplet mist is also evaporated in the inflow duct, with the result that the compressor intake air is cooled, thus resulting in an increase in the density of the intake air and of the conveyed mass flow. Furthermore, liquid drops penetrating into the compressor also ensure an intensive internal cooling in the compressor which consequently consumes less power, so that more of the turbine power is available for driving the generator. A sufficiently fine atomization of the liquid in the atomization device 11 by means of pressure atomizer nozzles preferably to be used, the aim being to achieve drop sizes of less than 50 μm, requires a high atomization admission pressure which is typically in the range of around 30 to 150 bar, in particular 100 to 150 bar, and even above this. Particularly when the drops are to penetrate into the compressor, highly purified demineralized water is required in order to avoid deposits on the compressor blades. According to the prior art, therefore, a water treatment device and a pump are arranged, which can make available the required demineralized water mass flow at a sufficiently high pressure. These devices are the reason for a considerable part of the investment costs of such a fogging/overfogging installation. The power plant illustrated has, furthermore, a water/steam circuit 2 known per se. This comprises a waste heat recovery steam generator 210 which itself has a preheater 211, an evaporator 212, a superheater 213 and a steam drum 214 and circulation pump 215 for the evaporator. The waste heat recovery steam generator has exhaust gases from the gas turbo group flowing through it in a way well know per se and utilizes their residual heat for steam generation. The functioning of the water/steam circuit is likewise familiar per se to a person skilled in the art: the generated steam is delivered via the fresh steam regulating valve 220 to a steam turbine 201 and expands there in order to drive a generator 202. The fresh steam regulating valve is activated in a way known per se by a steam turbine power controller, not illustrated. The expanded steam is conducted into a condenser 203 and condenses there. The condensate, which is present at a pressure of around 30-50 mbar as a function of the condenser temperature, is conveyed by a condensate pump 205 into the feed water tank 204 which, as stated below, in the present case serves at the same time as a degasser. The boiler feed pump 217 conveys the condensate, which typically has a pressure in the range of 2 to 5 bar in the feed water tank, up to the fresh steam pressure and into the steam generator, through which, as is likewise familiar to the person skilled in the art, the flow passes in the order preheater, evaporator, superheater, the circuit thus being closed. Numerous modifications of the circuit illustrated are familiar to the person skilled in the art, although these are not primarily essential to the invention in detail. In the present case, a partly expanded steam mass flow 207 is extracted from the steam turbine and is supplied as degassing medium to the feedwater tank 204. This may also be utilized in order to preheat the feedwater to a temperature which can prevent the gas turbo group smoke gases from undershooting the dew point in the region of the preheater 211. The feed water tank has, furthermore, a level control which can compensate water losses due to unavoidable leakages or during the degassing of the condensate. The level measurement is regulated by an inflow valve 206 which controls the supply of additional water from a water treatment system 216. Level control may take place continuously or else by two-position control. According to the invention, a line 14 branches off from the water/steam circuit downstream of a pump at suitable pressure, for example downstream of the boiler feed pump 217, and leads to the atomization device 11. This dispenses with the outlay involved in providing special pumps and separate water treatment for the fogging/overfogging, as it is known, that is to say the injection of liquid upstream of the compressor.

Figure 2:
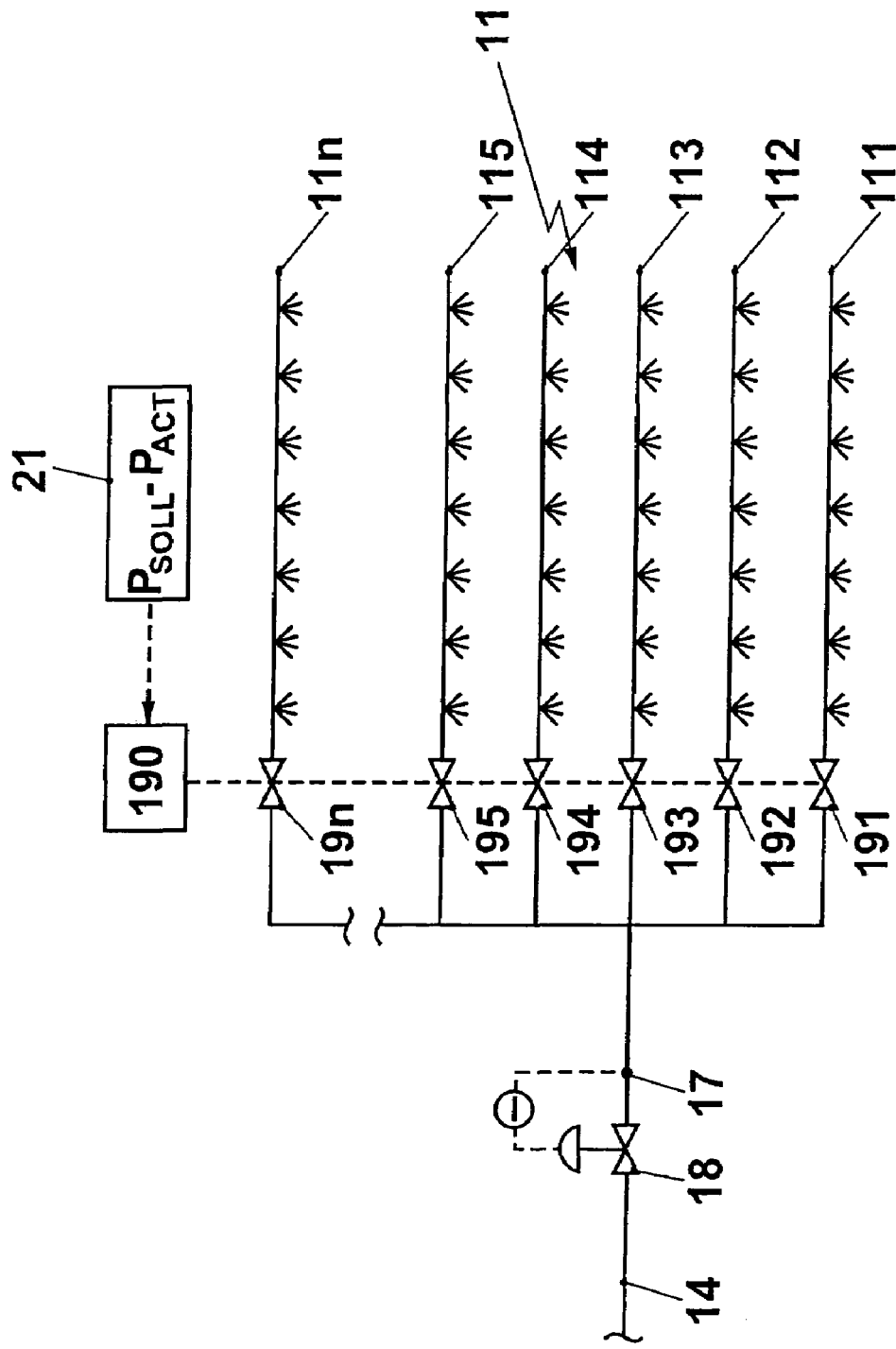
FIG. 2 shows a detail of the atomization device.

FIG. 2 is referred to in order to explain the actuating elements 18 and 19 and also the pressure measurement point 17 in more detail. The injection device 11 comprises a plurality of nozzle tubes 111 to 11n. These are selectively switched on and off via shut off members 191 to 19n. Each nozzle tube 111 to 11n carries a number of atomizer nozzles not illustrated individually, but familiar to a person skilled in the art. Where pressure atomizer nozzles are concerned, the fineness of the liquid mist generated is critically dependent on the atomization admission pressure. The line 14 therefore has a pressure regulating valve 18 arranged in it. This opens and closes as a function of a pressure determined at the pressure measurement point 17, in order to keep this pressure constant. The liquid mass flow is then determined critically by the free flow cross sections, that is to say the number of nozzle tubes acted upon by liquid. A function block 21 detects the actual power $P_{ACT}$ of the generator and a power desired value $P_{DES}$ and from these forms the desired/actual value deviation $P_{DES}$-$P_{ACT}$. The desired/actual value deviation is transferred to a control unit 190. In the case of a positive deviation, at least one of the shut off members 191, 192, . . . 19n is opened selectively, so that at least one nozzle tube is acted upon additionally by liquid and, with the admission pressure remaining the same, the injected liquid mass flow rises.

Referred to FIG. 1, therefore, the actuating member 18 is provided for keeping the atomization admission pressure constant or at least keeping it within a desired value range. The actuating member 19, that is to say, in the present case, a valve group, controls the mass flow of the liquid to be injected. The control of the mass flow and the control of the liquid admission pressure are at most advantageously decoupled from one another in the way illustrated. The liquid mass flow to be injected in the atomization device 11 is provided by the water treatment system 216. The water mass flow to be provided is regulated by means of the level control in the feedwater tank 204, thus ensuring that the mass flow which is extracted from the water/steam circuit for atomization in the intake tract of the gas turbo group is replaced by a supply from the water treatment system 216.

Figure 3:
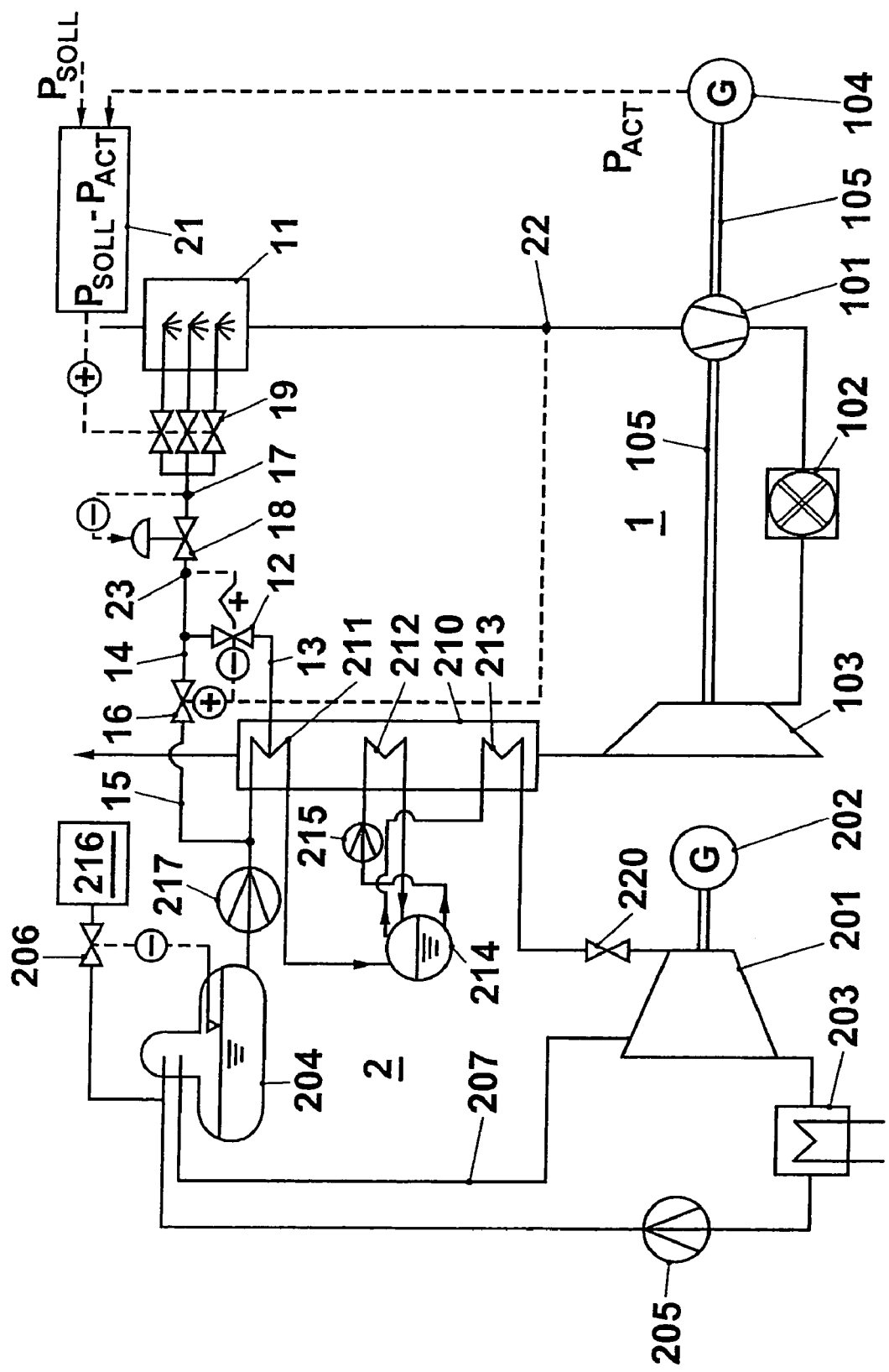
FIG. 3 shows a further embodiment of the invention.

A further embodiment of the invention is illustrated in FIG. 3. In addition to a first branch line 15 which branches off from the water/steam circuit downstream of the feed pump 7 and upstream of the steam generator 210, a second branch line 13 branches off from the water/steam circuit in the flow path of the steam generator, in the present case in the preheater 211. Both branch lines issue in a common supply line 14 to the atomization device 11. The intermixing of preheated and nonpreheated medium thus takes place upstream of the atomization device, thereby making this embodiment advantageous particularly in connection with atomizers not assisted by auxiliary media. Actuating members 12 and 16 make it possible to adjust the relative mass flows of the non preheated liquid in the branch line 15 and of the preheated liquid in the branch line 13 and consequently to set the temperature of the liquid in the supply line 14. A temperature measurement point 22 is arranged in the inflow duct of the gas turbo group, as directly as possible in front of the compressor inlet, and determines the temperature of the moist air or the air/drop mixture. On account of the evaporation effect and the acceleration of the flow towards the compressor inlet, the temperature at this point may lie considerably below the ambient temperature. The actuating members 12 and 16 are activated as a function of these measurement values. This, however, regulates only the mass flow ratios of preheated and nonpreheated fluid; furthermore, the overall mass flow is controlled in the way described above by means of the shut-off members 19 and the controller 21 as a function of the net power of the gas turbo group. In a first operating state, the actuating member 12 is closed completely. The entire mass flow of the atomization device 11 is conducted, without heating, through the first branch line 15. A maximum cooling of the intake air of the gas turbo group is consequently achieved, because the injected liquid has the lowest possible temperature. If the temperature measured at the measurement point 22 then undershoots a specific value, for example 7° C. or 5° C., the actuating member 12 is opened a little way and the actuating member 16 is closed a little way. Part of the water to be injected consequently flows into the preheater 211 of the steam generator 210 and is heated there. The temperature of the water to be injected is consequently increased, and, as a consequence, the temperature of the compressor inlet rises. A further temperature measurement point 23 is arranged upstream of the atomization device and downstream of the convergence of the preheated and nonpreheated liquid. If the atomization temperature measured there undershoots a specific safety margin of, for example, 5° C. or 8° C. with respect to the boiling temperature of the liquid at ambient pressure, the actuating member 12 is closed. At sea level and during operation with water, the critical temperature measurement value therefore lies in the range of around 90° C. to 95° C., and is correspondingly lower in the case of installations located at high altitude. Although this limit value regulation may lead to operational restrictions, it prevents serious cavitation damage which would occur on injection nozzles not specially prepared when the liquid boils spontaneously on emergence from the nozzle. The temperature regulation described is particularly useful in gas turbo groups which are installed at locations where no antiicing system, as it is known, familiar to the person skilled in the art is required per se, but at which an undershooting of the icing temperature may occur due to fogging or high fogging operation. In the case of a predetermined injected liquid mass flow and a limited liquid temperature, the temperature rise achievable thereby is, of course, limited. An absolute temperature rise of the air can also be implemented only when the mass flow of the liquid entrained as drops lies a multiple above the evaporated liquid mass flow, so that the sensible heat additionally introduced overshoots the evaporation heat. In any event, however, the ambient temperature range in which a fogging or high fogging installation can be operated can be extended. If an undershooting of the minimum permissible temperature at the compressor inlet can no longer be avoided, the atomization device 11 must, of course, be put out of operation. In these terms, therefore, the preheating of the liquid to be injected does not serve as absolute antiicing in the conventional sense, but serves for extending the operating range of the atomization device.

In a further type of operation, the atomization device may also be operated as a "genuine" antiicing system. For this purpose, however, the mass flow regulation must be decoupled from the power regulation, and the mass flow must be operated with the measurement value of the measurement point 22 as the regulating variable. An absolute lift in temperature, however, is possible only when, in actual fact, sufficiently heated liquid is injected to ensure that the air of the compressor inlet is oversaturated, that is to say drops also enter the compressor. Thus, in the case of installations which per se do not require antiicing or require it only on a few days in the year, operation can be ensured, without a complicated antiicing device having to be specially arranged.

Figure 4:
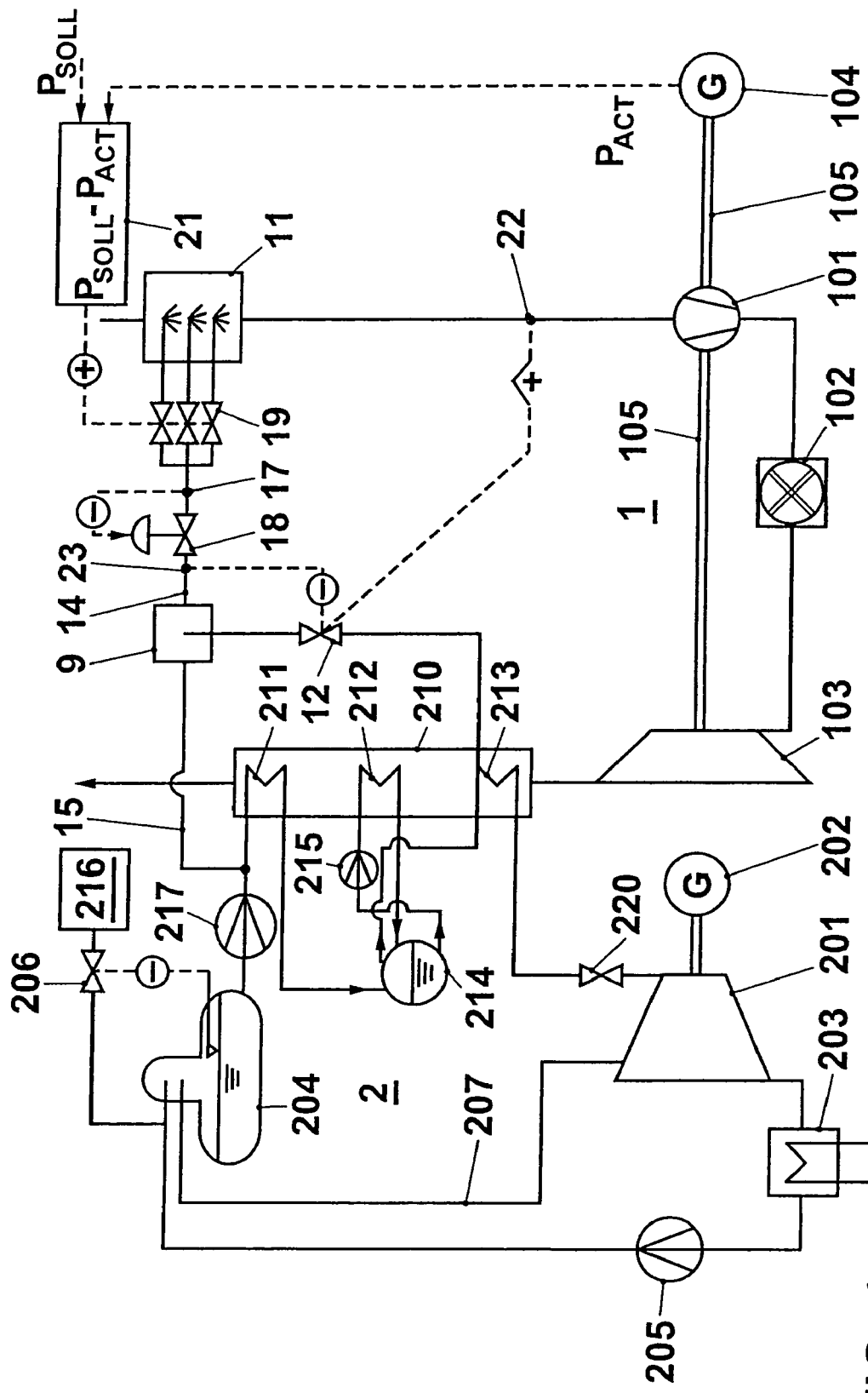
FIG. 4 shows an embodiment of the invention, with flash atomizers being used as an example.

The embodiment according to FIG. 4 differs from the example illustrated in FIG. 3, inter alia, in that the preheated and non preheated mass flow fractions are regulated to keeping the atomization temperature, measured at the measurement point 23, constant. This is advantageous most particularly when the atomization device 11 operates with flash atomizers. In this case, the liquid is supplied under pressure at a temperature which, on emergence from an atomizer nozzle and during the accompanying decompression to ambient pressure, leads to spontaneous boiling and consequently on account of the steam pressure, to the bursting of the drops into small fragments. This is described in WO 9967519. In addition to the atomization admission pressure, in this case, the steam pressure of the liquid is also of central importance for the atomization quality, and therefore, in this case, a regulation of the temperature of the liquid to be atomized to a desired value is highly advantageous. Furthermore, the embodiment illustrated here differs from that illustrated in FIG. 3 in that the first branch line 15 and the heating media line having the actuating member 12 do not issue directly into the supply line 14, but in a mixing preheater 9 which itself has an issue into the supply line 14. Water carried in the first branch line 15 is intermixed in the mixing preheater 9 with a heating medium extracted in the waste heat recovery steam generator 210 and carried via the heating media line and is at the same time heated. In the example illustrated, the heating medium is extracted as superheated steam in the superheater 213. This embodiment is distinguished, particularly when a substantial lift in temperature is required for flash atomization, in that the heating media mass flow can be comparatively low. It is also possible, of course, to arrange the heating media line at the steam drum 214 for the extraction of saturated steam or saturated water. A further possible embodiment is distinguished in that boiling water or a boiling water/saturated steam mixture is extracted in the evaporator 212. In a further embodiment, heated water is extracted as heating medium from the preheater 211. The selection of the extraction point is ultimately to be carried out by the person skilled in the art with the aid of his specialized knowledge and taking into account the thermodynamic boundary conditions. The use, illustrated as an example, of high-energy steam as a heating medium allows a high temperature rise along with a low heating media mass flow. By contrast, the use of a lower-value heating medium requires a higher heating media mass flow, but, on the other hand, makes accurate temperature regulation easier, since a regulating action on the heating mass flow then, of course, has a lesser effect on the temperature adopted as regulating variable. Furthermore, in the embodiment illustrated, an actuating member 12 is arranged only in the heating media line. This makes regulation easier, since action has to be taken on only one actuating member; however, the non preheated mass flow through the first branch line 15 cannot be regulated separately and therefore also cannot in actual fact be switched off. The temperature in the inflow duct, determined by means of the measurement point 22, is used as a regulating variable for limit regulation. When this overshoots an permissible maximum value, the temperature of the atomization liquid must be reduced. This is carried out by the actuating member 12 being closed. If appropriate, further protective measures must then also be taken, up to putting liquid injection in the inflow duct out of operation. It goes without saying that the switching of the branch lines, which is illustrated in FIG. 4, may also be employed for regulating the temperature in the inflow duct or compressor inlet.

Figure 5:
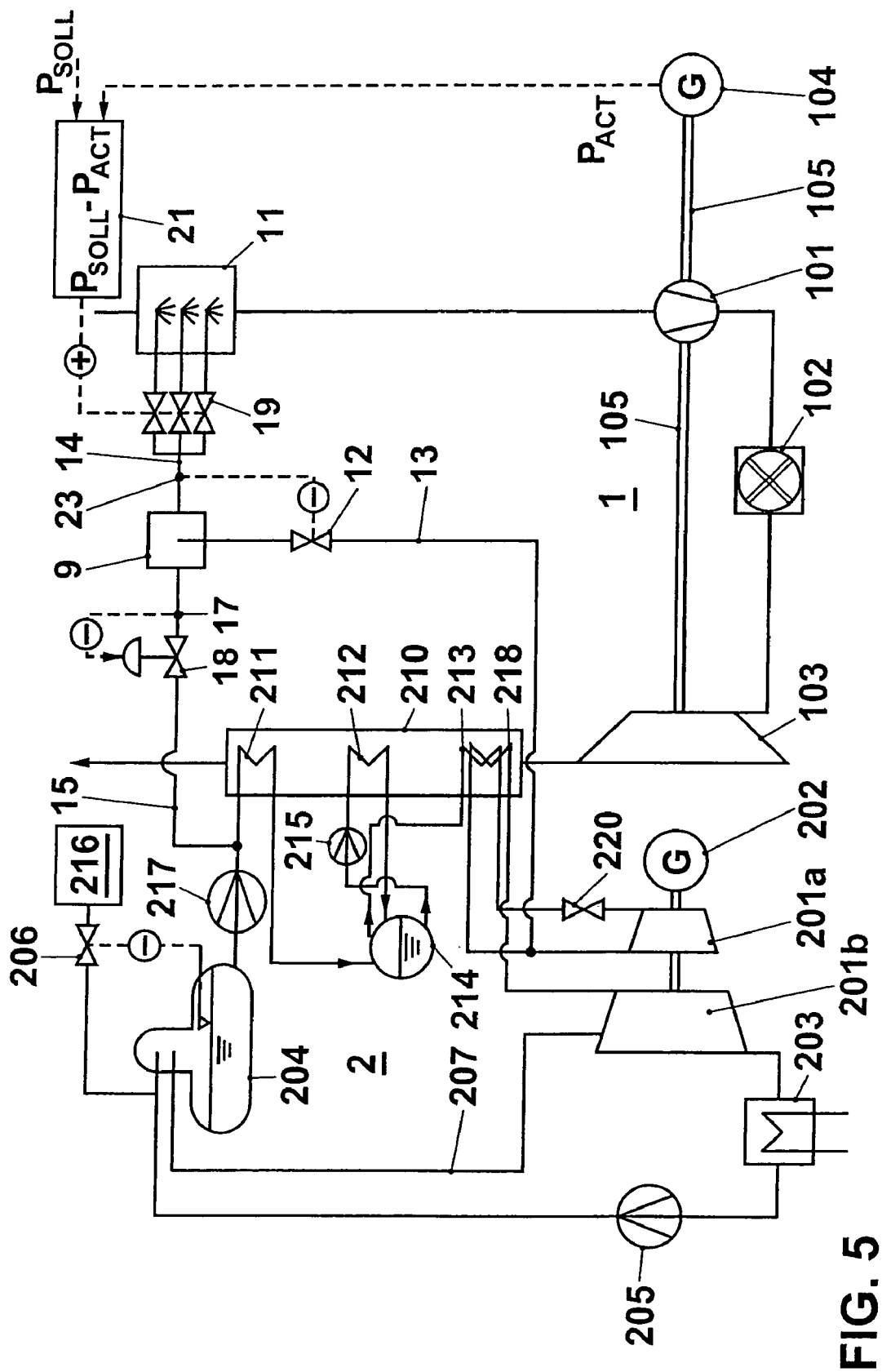
FIGS. 5 and 6 show further alternative embodiments of the invention, with flash atomizers being used as an example.

In the embodiment according to FIG. 5, tap steam from the steam turbine is used as a heating medium. In this case, the mixing preheater 9 must, of course, be arranged downstream of the pressure regulating valve 18, and the pressure must be adjusted to a value which lies below the pressure at the tapping point of the water/steam circuit. In a multiplicity of situations, it will not be viable to arrange a tapping point specially on the steam turbine. A water/steam circuit with intermediate superheating is therefore illustrated. The steam turbine in this case consists of a high-pressure steam turbine 201a and of a medium/low-pressure steam turbine 201b. Fresh steam from the superheater 213 is expanded in the high-pressure turbine 201a approximately to the saturated steam state and is then brought approximately to the fresh steam temperature again in an intermediate superheater 218 and expanded in the medium/low-pressure turbine 201b to condenser pressure. The second branch line 13 may follow here, in a particularly simple way, in the region of the intermediate superheater 218. In this case, saturated steam is extracted at the outlet from the high-pressure turbine 201a, as illustrated, or superheated steam is extracted at the inlet into the medium/low-pressure turbine 201b. The branch line may also follow the intermediate superheater 218, but access to the waste heat recovery steam generator is more complicated to implement in terms of apparatus than a connection to inflow and outflow lines running outside the boiler.

Figure 6:
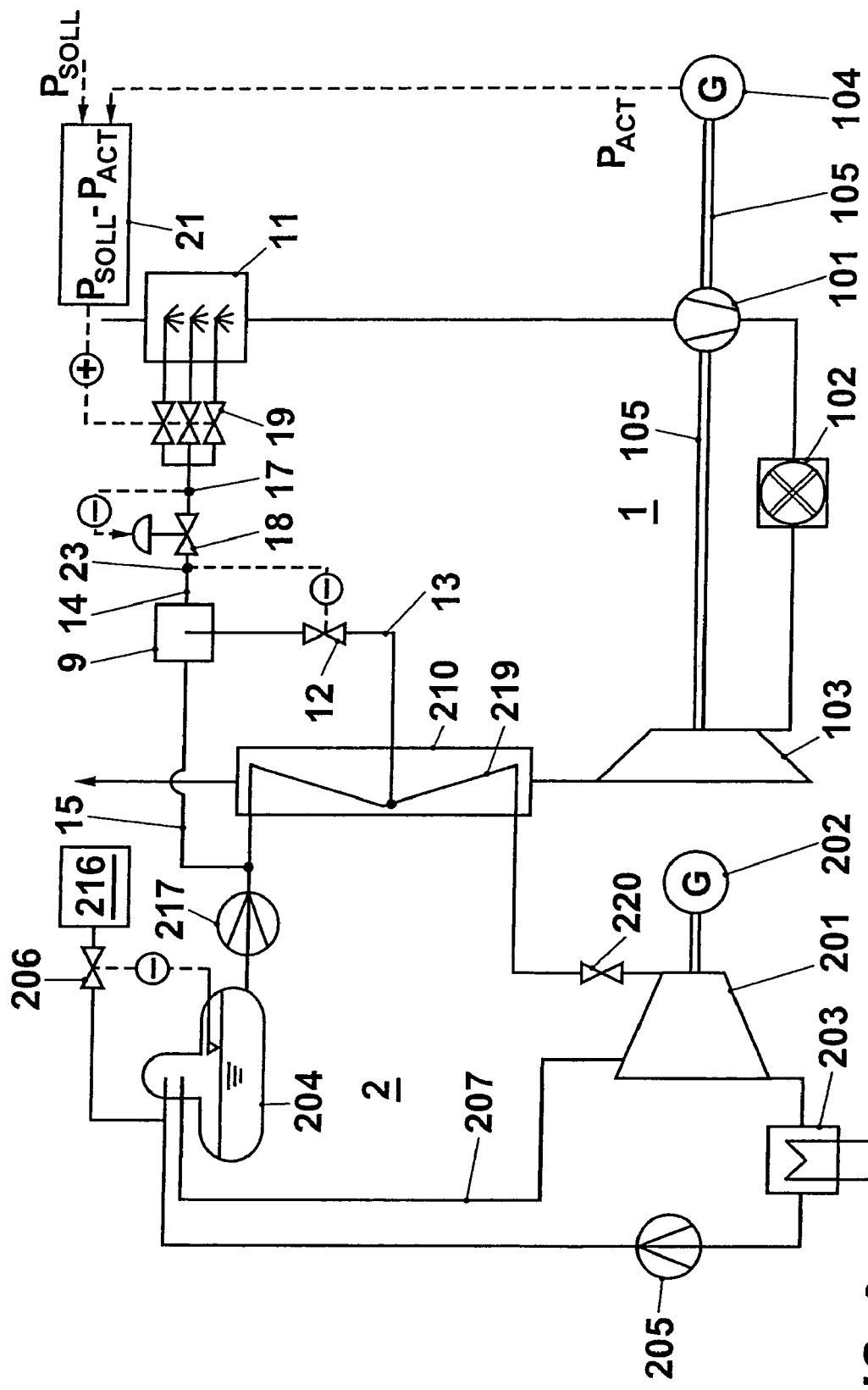

FIG. 6 illustrates an embodiment of the invention, similar to the arrangement from FIG. 4, with a once-through waste heat recovery steam generator. Once-through steam generators are distinguished in that they do not have separate heat exchanger pipework for preheating, evaporation and superheating, but, instead, the feedwater is heated and evaporated and the steam occurring is superheated essentially in one heat exchanger unit. This requires a somewhat higher outlay in regulating terms, but this is compensated by the markedly low outlay in terms of apparatus, and therefore this type of boiler construction is often used in combined cycle plants and is familiar in its detail to the person skilled in the art. As stated in connection with FIG. 4, a first branch line 15 branches off from the water/steam circuit downstream of the boiler feed pump 7 and upstream of the boiler and issues in a mixing preheater 9. Within the waste heat recovery steam generator, a second branch line 13 for the heating medium branches off at a point to be selected according to the desired state of the heating medium, the mass flow of the heating medium being controllable via the actuating member 12. As regards the regulation or control of the heating media mass flow, the considerations set out in connection with FIGS. 3 and 4 apply in a similar way. In a similar way to the statements relating to FIG. 4, the heating medium may be heated water, boiling water, saturated steam or superheated steam; the tapping point of the heat exchanger pipework is to be selected correspondingly.

Figure 7:
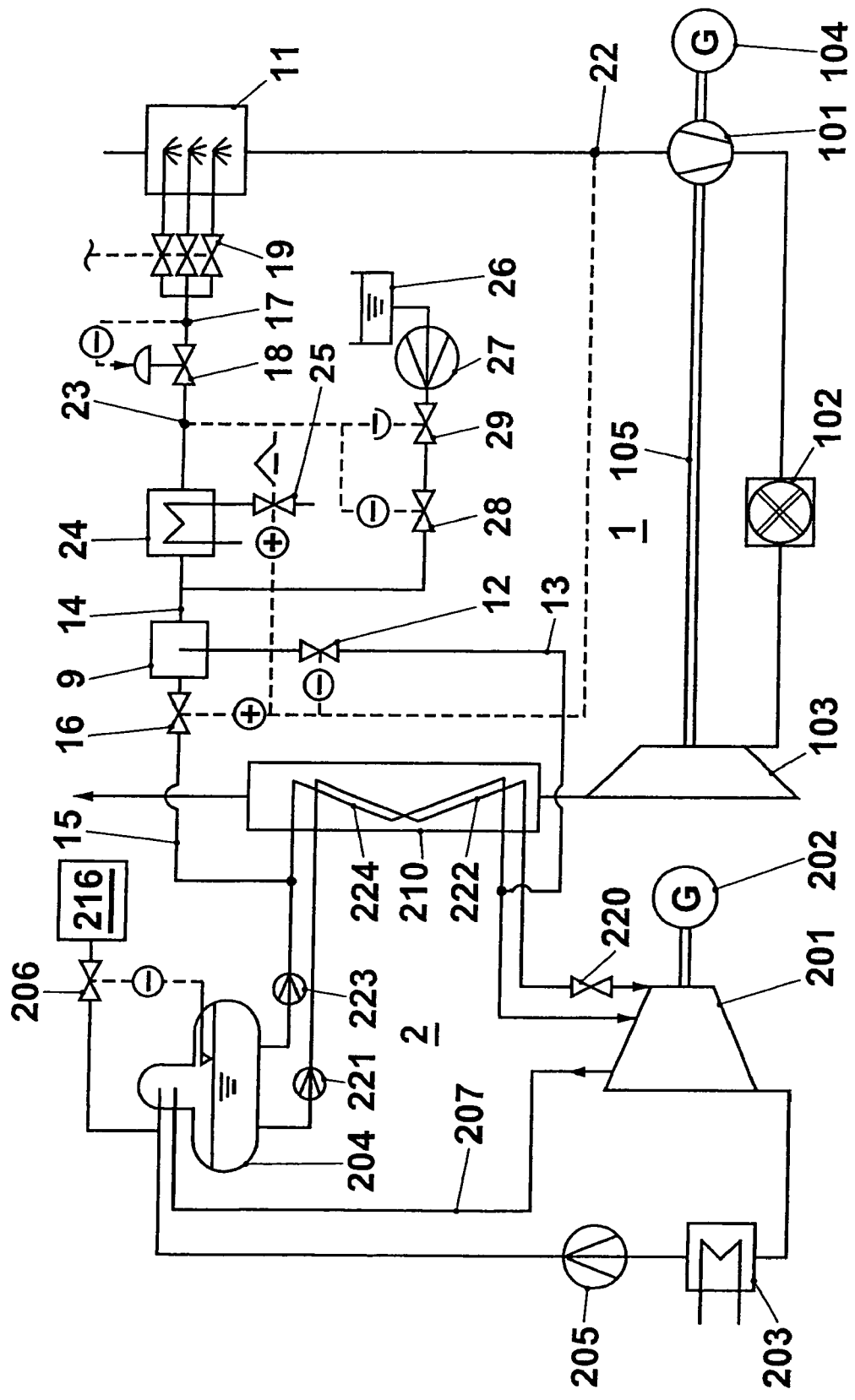
FIG. 7 shows a further advantageous embodiment of the invention.

The embodiment illustrated in FIG. 7 has a two-pressure water/steam circuit, the waste heat recovery steam generator being designed as a two-pressure once-through flow boiler. The feed water tank 204 has branched off from it a high-pressure branch with the high-pressure feed pump 221 and with the high-pressure steam generator pipework 222 and a medium-/low-pressure branch with the medium-/low-pressure feed pump 223 and with the medium-/low-pressure steam generator pipework 224. The generated high-pressure steam is expanded by the entire steam turbine 201, while the medium-/low-pressure branch issues, at a point of adapted pressure, into an intermediate infeed located further downstream of the steam turbine. This circuit variant of a water/steam circuit is familiar per se to the person skilled in the art and therefore requires no further explanations. Moreover, the statements made above as regards the functioning of the components of the water/steam circuit also apply. If the fresh steam pressure of the water/steam circuit lies considerably above the necessary atomizer admission pressure of the atomization device 11, the pressure regulating valve 18 must reduce pressure to a very great extent. This is the case particularly at high fresh steam pressures where pressure atomization devices are concerned, but also when atomizers assisted by auxiliary media or, for example, rotary atomizers are used, and, where appropriate, also when flash atomization is employed. Depending on the water mass flow to be injected and on the necessary pressure reduction, this may have comparatively slight, but nevertheless detectable effects on the characteristic energy consumption and consequently on the efficiency of the power plant; for example, in the case of a water mass flow of 25 kg/s, a throttling of 50 bar corresponds to a uselessly heated power of around 125 kW. The aim, therefore, is to arrange the branch points for feeding the atomization device 11 as far as possible at adapted pressure. This is implemented in the exemplary embodiment, in that the branches are arranged in the medium-/low-pressure branch. Downstream of the medium-/low-pressure feed pump 223 and upstream of the medium-/low-pressure steam generator pipework, a first branch line 15 branches off from the water/ steam circuit; this carries non preheated pressure water to the mixing preheater 9 via a regulating member 16. A second branch line 13 branches off from the heat exchanger pipework within the boiler, or, as illustrated, downstream of this. The latter variant can generally be implemented more easily because access to the boiler does not have to be provided. It is also perfectly possible for a branch line to branch off from the water/steam circuit directly downstream of the condensate pump 205 when the pressure prevailing there is compatible with the required liquid admission pressure of the atomization device; this is the case, for example, when atomizers assisted by auxiliary media are used, where a high liquid admission pressure is not required. Of course, a line branching off there could also be led via a separate heat exchanger arranged in the region of the waste heat recovery steam generator. The second branch line 13 carries a regulatable mass flow of superheated steam as heating medium to the mixing preheater 9 via the actuating member 12. Preheated water flows out of the mixing preheater 9 into the supply line 14. Furthermore, in the embodiment according to FIG. 7, a cooler 24 is arranged in the liquid line 14. The coolant inflow to the coolant 24 and consequently its cooling capacity are controlled by the actuating member 25. As stated in connection with FIG. 3, it is possible, in the interaction of the actuating members 12 and 16, to regulate the temperature, detected by means of the temperature measurement point 22, in the inflow duct upstream of the compressor inlet to a minimum value. It is possible, furthermore, at least within certain limits, to lower the temperature in the inflow duct, detected by means of a measurement point 22, by a cooling of the liquid in the cooler 24. It is thus possible, for example, to adjust the temperature of the measurement point 22 to as low a value as possible above the icing temperature. Limits are set in that the temperature of the measurement point 23 must always remain above the freezing temperature of the liquid. Where pure water is concerned, very narrow limits are placed on the additional intake air cooling by the precooling of the liquid to be atomized. One measure is the metering of alcohols or other suitable antifreeze additives upstream of the cooler. In the embodiment according to FIG. 7, an additive tank 26 is arranged, from which a suitable additive can be admixed, as required, to the atomization liquid, upstream of the cooler 24, via a pump 27, a shut off valve 29 and an actuating member 28. If the temperature of the measurement pump 23 undershoots a limit value, the shut off member 29 is opened. The actuating member 28 is regulated such that the conveyed additive mass flow increases with a falling temperature according to a predetermined additive concentration temperature profile. It is therefore possible to achieve a maximum permissible cooling of the air at the compressor inlet, at the same time with an oversaturation of the air with moisture and the resulting internal cooling effect in the compressor. The net power output of the gas turbo group which serves for driving the generator can consequently be maximized.

The embodiments selected above do, of course, include many different combination possibilities.

Applying the invention, it is possible, in combined cycle power plants, in a simple way to provide an atomization device for fogging or high fogging upstream of the compressor and particularly to retrofit such an atomization device in existing plants. In this case, the water treatment and pump capacities present in any case are also used for operating the atomization device. This is beneficial, above all, against the background that the existing devices, as a rule, in any case have some overcapacities. Particularly when the branch points are arranged on pipelines or components of the water/steam circuit which lie outside the waste heat recovery steam generator, a retrofitting or conversion of existing plants can take place at a particularly low outlay in technical and financial terms, because, on the one hand, components present in any case are used and, on the other hand, existing or easily providable accesses are utilized for branching off the lines to be additionally arranged.

LIST OF THE REFERENCE SYMBOLS

1 Gas turbo group
2 Steam turbo group
6 Device for the provision of a liquid, water treatment system
9 Mixing preheater
11 Atomization device, misting device
12 Shut off and/or throttle member, actuating member
13 Branch line, second branch line
14 Supply line
15 Branch line, first branch line
16 Shut off and/or throttle member, actuating member
17 Pressure measurement point
18 Pressure regulating valve
19 Mass flow actuating member, control block, shut off valves
21 Function block, controller
22 Temperature measurement point
23 Temperature measurement point
24 Cooler
25 Actuating member
26 Additive tank
27 Conveying pump
28 Actuating member
29 Shut off member
101 Compressor
102 Combustion chamber
103 Turbine
104 Generator
105 Shaft
111, 112, . . . , 11n Nozzle tubes
191, 192, . . . , 19n Shut off members
190 Function block
201 Steam turbine
201a High-pressure steam turbine
201b Medium-/low-pressure steam turbine
202 Generator
203 Condenser
204 Feed water tank, feed water tank/degasser
205 Condensate pump
206 Actuating member
207 Steam extraction
210 Waste heat recovery steam generator, boiler
211 Preheater
212 Evaporator
213 Superheater, high-pressure superheater
214 Drum
215 Circulation pump
216 Water treatment system
217 Boiler feed-pump
218 Medium-/low-pressure superheater
219 Heat exchanger pipework, steam generator pipework
220 Fresh steam regulating valve
221 High-pressure feed pump
222 High-pressure heat exchanger pipework, high-pressure steam generator pipework
223 Medium-/low-pressure feed pump
224 medium-/low-pressure heat exchanger pipework, medium-/low-pressure steam generator pipework
$P_{ACT}$ Actual power
$P_{DES}$ Power desired value

The invention claimed is:

1. A power plant, comprising:
a gas turbo group and a water/steam circuit which includes a steam turbine,
a waste heat recovery steam generator arranged downstream of a turbine of the gas turbo group,
a condenser arranged downstream of the steam turbine,
a pump arranged downstream of the condenser and upstream of the waste heat recovery steam generator, and
an inflow duct arranged upstream of a compressor of the gas turbo group for air flowing into the compressor, in which inflow duct an atomization device for a liquid is arranged,
wherein a first branch line branches off from the water/steam circuit at a first point of the water/steam circuit, a second branch line branches off from the water/steam circuit at a second point located downstream of the first point in the water/steam circuit, and both branch lines issue in a common supply line leading to the atomization device.

2. The power plant as claimed in claim 1, wherein the first point is arranged upstream of the waste heat recovery steam generator, and the second point is arranged in the waste heat recovery steam generator or downstream of the latter.

3. The power plant as claimed in claim 1, wherein the branch lines issue into a mixing preheater, the outflow of which leads to the supply line.

4. The power plant as claimed in claim 1, wherein the first point is selected such that liquid water is present at the branch point in the flow path, and the second point is selected such that steam is present at the branch point in the flow path.

5. The power plant as claimed in claim 1, wherein at least one of the branch lines has a shut off and/or throttle member.

6. A power plant, comprising:
a gas turbo group and a water/steam circuit which includes a steam turbine,
a waste heat recovery steam generator arranged downstream of a turbine of the gas turbo group,
a condenser arranged downstream of the steam turbine,
a pump arranged downstream of the condenser and upstream of the waste heat recovery steam generator, and
an inflow duct arranged upstream of a compressor of the gas turbo group for air flowing into the compressor, in which inflow duct an atomization device for a liquid is arranged, wherein at least one line leading to the atomization device branches off from the water/steam circuit downstream of the pump, and wherein a pressure regulating valve for regulating the atomization admission pressure is arranged in the at least one line leading to the atomization device.

7. The power plant as claimed in claim 1, wherein a cooler is arranged in the supply line.

8. A method for operating a power plant having a gas turbo group and a water/steam circuit which includes a steam turbine, a waste heat recovery steam generator arranged downstream of a turbine of the gas turbo group, a condenser arranged downstream of the steam turbine, a pump arranged downstream of the condenser and upstream of the waste heat recovery steam generator, an inflow duct arranged upstream of a compressor of the gas turbo group for air flowing into the compressor, in which inflow duct an atomization device for a liquid is arranged, wherein a first branch line branches off from the water/steam circuit at a first point of the water/steam circuit, a second branch line branches off from the water/steam circuit at a second point located downstream of the first point in the water/steam circuit, and both branch lines issue in a common supply line leading to the atomization device, the method comprising the steps:

supplying a first, nonpreheated part mass flow through the first line to the common supply line;

supplying a second, preheated part mass flow through the second line to the common supply line; and varying at least one of the part mass flows.

9. The method as claimed in claim 8, comprising the further steps of cooling the mass flow in the common supply line and of varying the cooling capacity.

10. A method for operating a power plant having a gas turbo group and a water/steam circuit which includes a steam turbine, a waste heat recovery steam generator arranged downstream of a turbine of the gas turbo group, a condenser arranged downstream of the steam turbine, a pump arranged downstream of the condenser and upstream of the waste heat recovery steam generator, an inflow duct arranged upstream of a compressor of the gas turbo group for air flowing into the compressor, in which inflow duct an atomization device for a liquid is arranged, wherein a first branch line branches off from the water/steam circuit at a first point of the water/steam circuit, a second branch line branches off from the water/steam circuit at a second point located downstream of the first point in the water/steam circuit, and both branch lines issue in a common supply line leading to the atomization device, the method comprising:

arranging a cooler in the supply line, and varying the cooling capacity of the cooler.

11. The method as claimed in claim 8, comprising the further steps: measuring at least one of the following temperatures: temperature of the liquid to be atomized and temperature in the inlet of the compressor of the gas turbo group; varying in a regulated manner at least one part mass flow and/or the cooling capacity with the measured temperature as the regulating variable.

12. The power plant as claimed in claim 6, wherein a cooler is arranged in the at least one line.

* * * * *